(12) United States Patent
Lee et al.

(10) Patent No.: US 7,751,330 B2
(45) Date of Patent: Jul. 6, 2010

(54) METHOD AND APPARATUS FOR DYNAMICALLY MANAGING HIERARCHICAL FLOWS

(75) Inventors: Bhum-cheol Lee, Daejeon-si (KR);
Jung-hee Lee, Daejeon-si (KR);
Hyun-yong Hwang, Daejeon-si (KR);
Dae-geun Park, Daejeon-si (KR);
Seung-woo Lee, Seoul (KR); Young-ho Park, Daejeon-si (KR); Kyung-pyo Jun, Daejeon-si (KR); Young-sun Kim, Daejeon-si (KR)

(73) Assignee: Electronics and Telecommunications Research Institute, Daejeon-si (KR)

(*) Notice: Subject to any disclaimer, the term of this patent is extended or adjusted under 35 U.S.C. 154(b) by 165 days.

(21) Appl. No.: 12/079,046

(22) Filed: Mar. 24, 2008

(65) Prior Publication Data

US 2009/0040929 A1 Feb. 12, 2009

(30) Foreign Application Priority Data

Aug. 8, 2007 (KR) .................. 10-2007-0079738

(51) Int. Cl.
*H04L 1/00* (2006.01)
(52) U.S. Cl. .................. 370/235; 370/231; 370/232
(58) Field of Classification Search .................. 370/235, 370/229, 230, 231, 232
See application file for complete search history.

(56) References Cited

U.S. PATENT DOCUMENTS

| | | | |
|---|---|---|---|
| 6,226,267 B1* | 5/2001 | Spinney et al. .............. | 370/235 |
| 6,574,195 B2 | 6/2003 | Roberts | |
| 6,795,441 B1 | 9/2004 | Widmer et al. | |
| 7,161,904 B2* | 1/2007 | Hussain et al. .............. | 370/230 |
| 7,512,071 B2* | 3/2009 | Goldschmidt et al. ....... | 370/235 |
| 7,606,158 B2* | 10/2009 | Fedorkow et al. .......... | 370/235 |
| 2005/0141427 A1* | 6/2005 | Bartky ........................ | 370/235 |
| 2007/0098007 A1* | 5/2007 | Prodan et al. ............... | 370/443 |
| 2007/0201499 A1* | 8/2007 | Kapoor et al. .............. | 370/412 |
| 2008/0253288 A1* | 10/2008 | Aimoto .................... | 370/235.1 |
| 2008/0316921 A1* | 12/2008 | Mathews et al. ............ | 370/230 |

FOREIGN PATENT DOCUMENTS

| | | |
|---|---|---|
| JP | 2002-204256 A | 7/2002 |
| KR | 10-0468606 B1 | 1/2005 |
| KR | 100468606 B1 | 1/2005 |
| KR | 10-2005-0061226 A | 6/2005 |
| KR | 10-2005-0061237 A | 6/2005 |

* cited by examiner

*Primary Examiner*—Chi H Pham
*Assistant Examiner*—Robert Lopata
(74) *Attorney, Agent, or Firm*—Blakely, Sokoloff, Taylor & Zafman LLP

(57) ABSTRACT

Provided are a method and apparatus for dynamically managing hierarchical flows that more efficiently process packet traffic while maintaining compatibility with an existing packet data network in transferring both circuit traffic and packet traffic in a packet switched network. The method for dynamically managing hierarchical flows includes: receiving data packets, classifying the data packets according to attributes of the received data packets, and producing first flows; determining whether traffic of each of the first flows exceeds a predetermined bandwidth limit, and performing a packet drop process or producing second flows for first flows that exceed the bandwidth limit, according to a flow-specific policy; and performing second flow processing on the second flows according to a second flow policy. Only flows exceeding the bandwidth limit or causing congestion are hierarchically divided for management. This makes it possible to finely manage the flows without complex operations.

12 Claims, 4 Drawing Sheets

METHOD AND APPARATUS FOR DYNAMICALLY MANAGING HIERARCHICAL FLOWS

CROSS REFERENCE TO RELATED APPLICATIONS

This application claims priority from Korean Patent Application No. 10-2007-0079738, filed on Aug. 8, 2007, the disclosure of which is incorporated herein in its entirety by reference.

BACKGROUND OF THE INVENTION

1. Field of the Invention

The present invention relates to traffic processing in a packet data network, and more particularly, to a method and apparatus for dynamically managing hierarchical flows that enables more efficient processing of packet traffic while maintaining compatibility with an existing packet data network in transferring both circuit traffic and packet traffic in a packet switched network.

This work was supported by the IT R&D program of Ministry of Information and Communication (MIC)/Institute for Information Technology Advancement (IITA) [2007-S-012-01, Project Title: Multimedia Convergence Network on Chip Technology Development].

2. Description of the Related Art

In a current switched network, a circuit switched network and a packet switched network coexist. Gradually, the circuit switched network is being incorporated into the packet switched network, but the process of incorporation is slow because the two networks each have their advantages and disadvantages.

A packet switched network is mainly comprised of Ethernet and Internet Protocol (IP)-based Ethernet switches and routers. Its most serious disadvantage is that it is difficult to guarantee Quality of Service (QoS). A current packet switched network often cooperates with a multimedia network or a conventional Time Division Multiplexing (TDM)/Synchronous Digital Hierarchy (SDH) network, causing a network synchronization problem.

Several techniques for solving the QoS problem in the packet switched network have been disclosed. QoS depends mainly on traffic or bandwidth management techniques selected depending on the location and scale of the network.

For example, there is a bandwidth management method using a hop-by-hop scheme that may be used in an access network or a metro network. This bandwidth management method may be classified into a hierarchical bandwidth management method and a classification-based bandwidth management method.

The hierarchical bandwidth management method is disclosed in U.S. Pat. No. 6,795,441. The hierarchical bandwidth management method includes hierarchically assigning different bands to stages, and fairly transferring traffic transmitted and received by terminals using a scheduler guaranteeing fairness in a switch of each stage. The method is widely used because the switch in each stage can be easily managed and fairness for best effort traffic is guaranteed.

In this method, however, when congestion occurs while a terminal is using a certain bandwidth for traffic other than best effort traffic, such as a moving-picture stream, data packets may be lost in spite of the terminal using sufficient bandwidth. This problem is not very serious because real-time virtual circuit traffic occupies a smaller part of the bandwidth in the packet switched network, but it may become serious in a future circuit switched network incorporated into a packet switched network.

As an example of a method for solving this problem, a classification-based bandwidth management method is disclosed in U.S. Pat. No. 6,574,195. The classification-based bandwidth management method uses a concept of a micro flow, which will now be described in greater detail.

A switch in each stage finely classifies traffic received from respective terminals into layer 2 to upper layers depending on its attributes. The resultant flows are referred to as micro flows. The bandwidth is managed by micro flows as traffic units. This method advantageously guarantees fair aggregation, distribution and switching while maintaining traffic attributes because the switch in each stage manages the bandwidth by finely dividing traffic according to its attributes.

However, the method requires finely predefining attributes (e.g., QoS set) of flows depending on the traffic, and is incapable of compensating attributes of a damaged flow when the network cooperates with a network that uses a different bandwidth management method. The method makes management difficult because it requires newly defined flow attributes for new services.

Another hierarchical bandwidth management method, disclosed in U.S. Pat. No. 7,161,904, involves hierarchically dividing flows according to their attributes, measuring a bandwidth for each layer, and managing the bandwidth according to the measurement. This method enables management of traffic with different attributes separately or in association, but traffic management becomes more difficult as the number of flows increases.

The above problems with conventional bandwidth management methods have motivated research into new methods. One relatively simple method involves transferring real-time traffic while maintaining its attributes. In the field of a local area network (LAN) switch, residential Ethernet and an AV bridge originate from a synchronous Ethernet.

In the method, frame synchronization is performed in a network and packet delay is held constant in a switch and a bridge of each stage for QoS guarantee and network synchronization. Also, the QoS guarantee and high-definition network synchronization in the Ethernet helps solve problems associated with a conventional Ethernet. However, the method is incompatible with the conventional Ethernet and requires frame synchronization in all switches and bridges in the network.

SUMMARY OF THE INVENTION

The present invention provides a method for dynamically managing hierarchical flows that performs flow processing by classifying received data packets according to their attributes to produce first flows, and performing a packet drop process on first flows that exceed the bandwidth or producing second flows, according to a flow-specific policy.

Accordingly, the method can be embodied in a simple manner while finely managing the bandwidth, and a flow of traffic whose attributes need to be maintained is divided, for example, only upon congestion or bandwidth restriction, thereby achieving efficient management and traffic attribute maintenance.

Additional aspects of the invention will be set forth in the description which follows and, in part, will be apparent from the description, or may be learned by practice of the invention.

The present invention discloses a method for dynamically managing hierarchical flows, including: receiving data packets, classifying the data packets according to attributes of the received data packets, and producing first flows; determining whether traffic of each of the first flows exceeds a predetermined bandwidth limit, and performing a packet drop process or producing second flows for first flows that exceed the bandwidth limit, according to a flow-specific policy; and performing second flow processing on the second flows according to a second flow policy.

The producing of the second flows may include determining whether the traffic of each of the first flows exceeds the predetermined bandwidth limit, determining, when the traffic does not exceed the bandwidth limit, whether a data packet is received within a life cycle of each flow, and transferring, if the data packet is received, the data packet according to a first flow management policy.

The performing of the second flow processing may include determining whether traffic of each of the second produced flows exceeds the predetermined bandwidth limit, and performing a packet drop process or transferring a data packet when a flow exceeds the bandwidth limit, according to a flow-specific policy.

The present invention also discloses an apparatus for dynamically managing hierarchical flows, including: a packet receiver for receiving data packets; and a packet processor for classifying the received data packets based on attributes of the received data packets to produce first flows, determining whether traffic of each of the first flows exceeds a predetermined bandwidth limit, performing a packet drop process or producing second flows for first flows that exceed the bandwidth limit, according to a flow-specific policy, and performing flow processing on the second flows according to a second flow policy.

It is to be understood that both the foregoing general description and the following detailed description are exemplary and intended only to provide further explanation of the invention as claimed.

BRIEF DESCRIPTION OF THE DRAWINGS

The accompanying drawings, which are included to facilitate better understanding of the invention and are incorporated in and constitute a part of this specification, illustrate exemplary embodiments of the invention and, together with the description, serve to explain aspects of the invention.

DETAILED DESCRIPTION OF EXEMPLARY EMBODIMENTS

Figure 1:
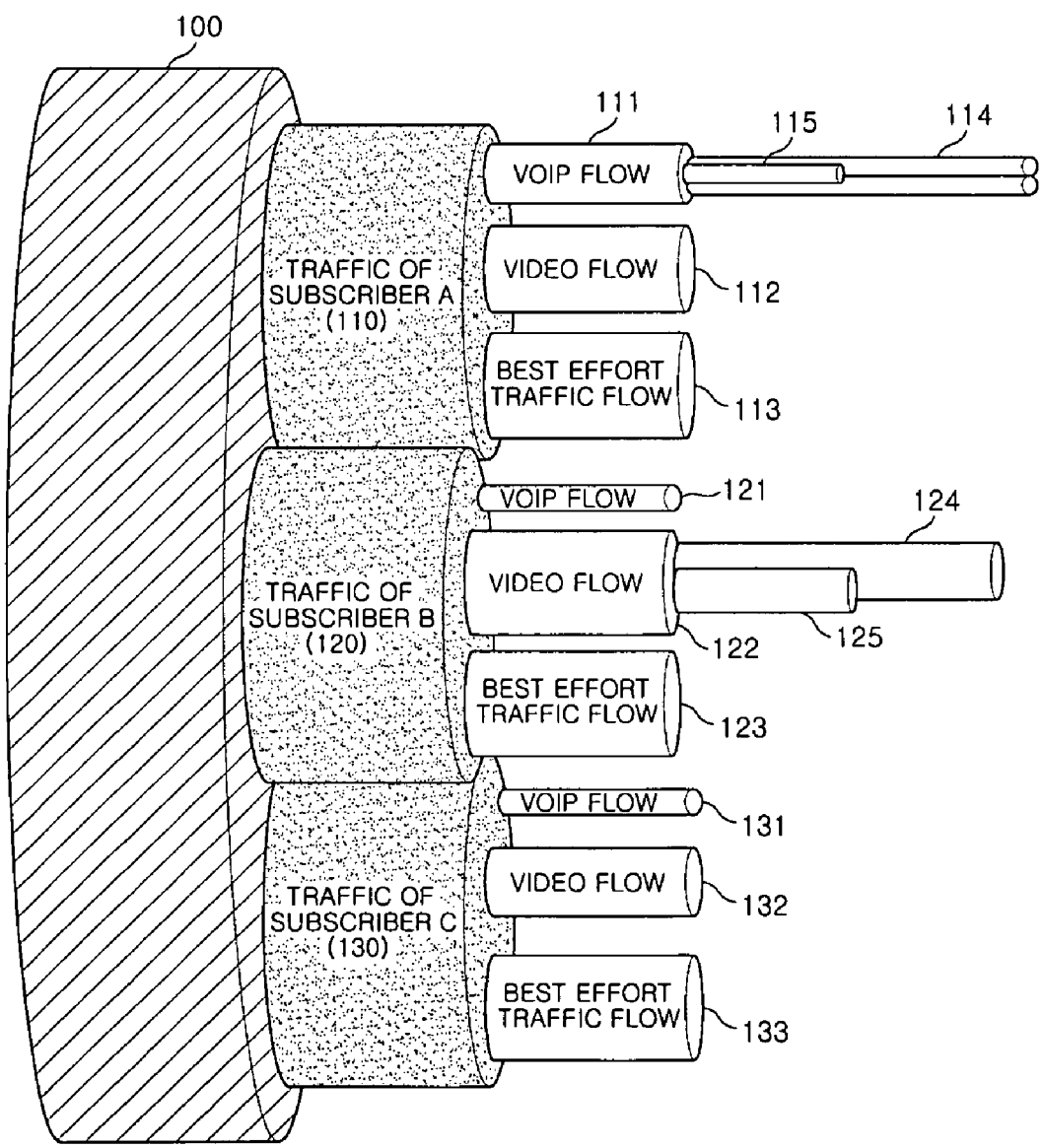
FIG. 1 illustrates an example of a hierarchical flow according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided to enable those skilled in the art to embody and practice the invention. Like reference numerals in the drawings denote like elements.

FIG. 1 illustrates an example of a hierarchical flow according to an exemplary embodiment of the present invention.

Data packets are received and classified, and flows are produced stepwise. These operations may be performed by several methods according to policies. In a first operation, for example, a frame field indicating a layer 2 source MAC address and an IEEE802.1p priority may be referred to in order to produce flows for subscribers transmitting data packets and services, and a source IP address and a Type of Service (ToS) field in layer 3 may be referred to.

In a second operation, for example, a frame field indicating a layer 2 destination MAC address and a destination IP address field in layer 3 may be referred to in order to identify subscribers receiving data packets. To produce sub-flows, a layer 4 TCP/UDP, a port type, and a protocol may be referred to or deep packet inspection using four or more layers may be referred to.

In the present invention, flows of two or more operations may be produced stepwise. In the present embodiment, however, dynamic management of hierarchical flows using two layers by two operations will be described.

It is assumed that traffic 110 of subscriber A, traffic 120 of subscriber B, traffic 130 of subscriber C, traffic 114 of subscriber D, traffic 115 of subscriber E, traffic 116 of subscriber F, traffic 124 of subscriber G, and traffic 125 of subscriber H exist, and a policy for IEEE802.1p priority is determined in which first priority is assigned to VoIP traffic, second priority is assigned to video traffic, and third priority is assigned to best effort traffic.

It is also assumed that, for all subscribers, a VoIP transmit and receive bandwidth limit ("BL") is set to 128 Kbps, a video transmit and receive bandwidth limit is set to 4 Mbps, and a best effort traffic receive bandwidth limit as in the Internet is set to 5 Mbps. It is also assumed that a policy is defined whereby when VoIP traffic and video traffic exceed bandwidth limits, first and second flows are produced, while when best effort traffic exceeds the bandwidth limit, only the first flow is produced. Under theses assumptions, traffic of subscribers A, B and C may be defined as in Table 1:

TABLE 1

| Traffic of subscribers A, B and C | | | |
|---|---|---|---|
| | VoIP (BL = 128 Kbps) | Video (BL = 4 Mbps) | Best effort traffic (BL = 5 Mbps) |
| subscriber A | 192 Kbps | 3 Mbps | 8 Mbps |
| subscriber B | 64 Kbps | 5 Mpbs | 8 Mbps |
| subscriber C | 64 Kbps | 3 Mbps | 4 Mbps |

First flows of the traffic 110 of subscriber A, the traffic 120 of subscriber B, and the traffic 130 of subscriber C, such as VoIP flows 111, 121, and 131, video flows 112, 122, and 132, and best effort traffic flows 113, 123, and 133, are produced according to a given policy.

In this case, since the VoIP flow 111 of the traffic 110 of subscriber A exceeds a predetermined bandwidth limit (BL), second flows 114, 115, and 116 are produced according to the policy. Since the video flow 112 of the traffic 110 of subscriber A does not exceed the predetermined bandwidth limit, only the first flow is produced. Even though the best effort flow 113 of the traffic 110 of subscriber A exceeds the predetermined bandwidth limit, the second flow is not produced according to the policy.

Meanwhile, since the VoIP flow 121 of the traffic 120 of subscriber B does not exceed the predetermined bandwidth limit, only the first flow is produced. Since the video flow 122 of the traffic 120 of subscriber B exceeds the predetermined bandwidth limit, the second flows 124 and 125 are produced according to the policy. Even though the best effort flow 123 of the traffic 120 of subscriber B exceeds the predetermined bandwidth limit, the second flow is not produced according to the policy.

Since the VoIP flow 131 of the traffic 130 of subscriber C does not exceed the predetermined bandwidth limit, only the first flow is produced. Since the video flow 132 of the traffic 130 of subscriber C does not exceed the predetermined bandwidth limit, only the first flow is produced as well. Since the best effort traffic flow 133 of the traffic 130 of subscriber C does not exceed the predetermined bandwidth limit, only the first flow is produced as well.

In this case, since the second flows are produced based on a layer 2 destination MAC address as a destination subscriber address according to the policy, the flows 114, 115, 116, 124 and 125 for respective destinations are produced. Producing the second flows includes partially performing a policing/shaping, rate limiting, or congestion control process, which is a method of guaranteeing traffic bandwidth, because the first flow exceeds the bandwidth limit.

Packets of the flows exceeding the bandwidth limit may be processed or dropped according to several policies. In the case of VoIP, the rate limit is not applied to the whole VoIP flow 111. That is, the VoIP flow 111 is divided into flows 114, 115, and 116 according to destinations, and then, the rate limit is applied to only one of the flows. Notwithstanding, if the VoIP flow 111 exceeds the bandwidth, the rate limit is applied to the other flows to conserve the VoIP flow having a different destination, thus implementing a preemption function, as in circuit switching. Here, the flows to which the rate limit is applied are determined according to the policy, which may include last produced flow first, lower class first, destination attribute first, terminal attribute first, etc.

Likewise, in the case of the video flow 122 of the traffic 120 of subscriber B, since the first video flow exceeds the bandwidth limit, the second video flows 124 and 125 for respective destinations are produced. It may be desirable that the rate limit is applied to only one of the flows 124 and 125 rather than to both the flows 124 and 125.

In any of the VoIP flows 111, 121, and 131, the video flows 112, 122, and 132, and the Best effort traffic flows 113, 123, and 133 of the traffic 110 of subscriber A, the traffic 120 of subscriber B, and the traffic 130 of subscriber C, if a packet is not received for a predetermined period of time, the flow and the second corresponding flow are terminated. Since traffic is not constant, it may exceed the bandwidth with varying frequency. Once the flow is produced, it is kept alive until terminated.

Figure 2:
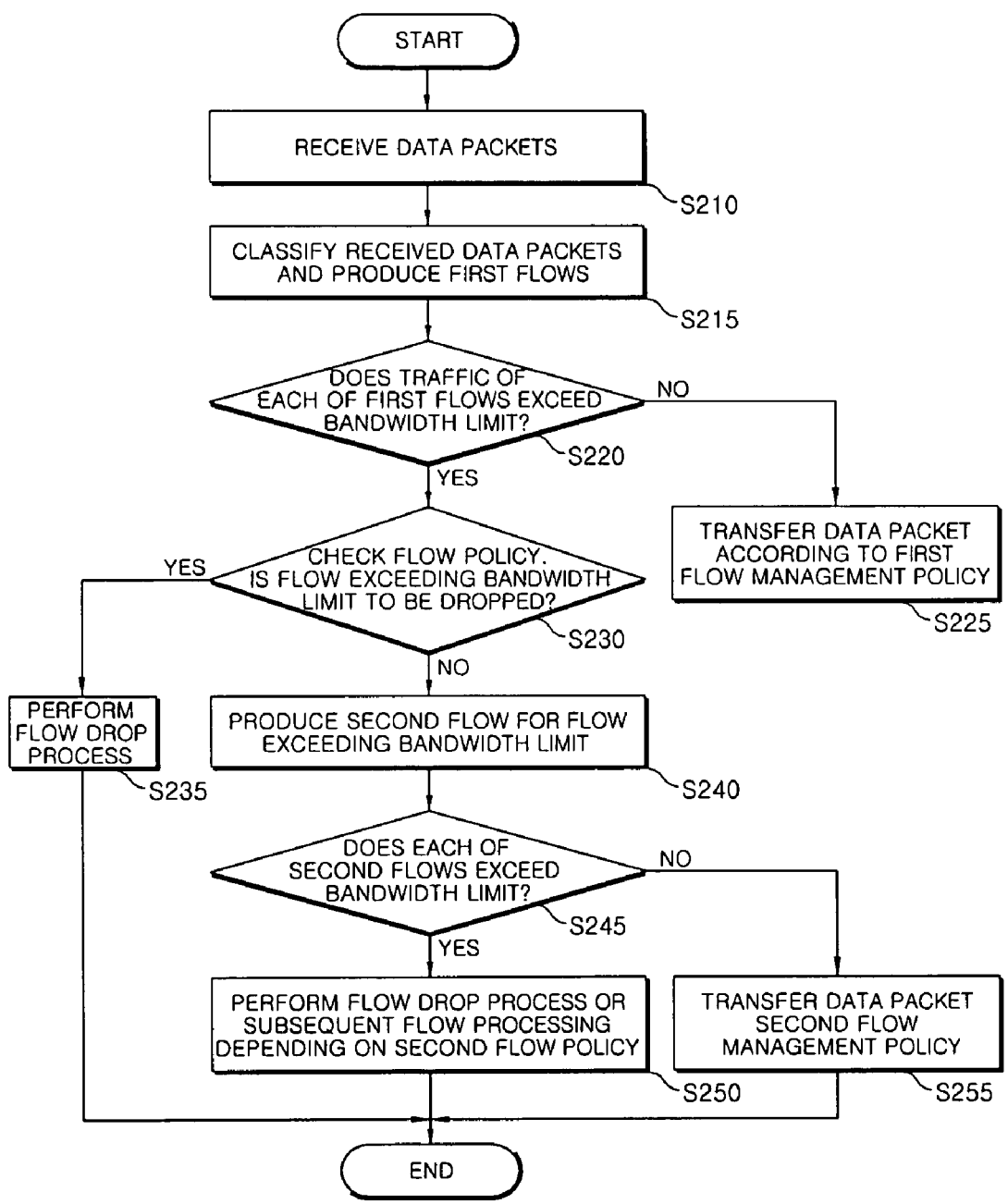
FIG. 2 is a flowchart illustrating a method for dynamically managing hierarchical flows according to an exemplary embodiment of the present invention.

FIG. 2 is a flowchart illustrating a method for dynamically managing hierarchical flows according to an exemplary embodiment of the present invention.

First, data packets are received (S210). The received data packets are classified to produce first flows (S215). There are several methods of classifying packets and producing the first flows based on policy, as described above. In the present exemplary embodiment, an example of producing flows of data packets based on transmitting subscriber and service by referring to a frame field indicating a layer 2 source MAC address and an IEEE802.1p priority will be described.

A determination is then made as to whether traffic of each of the first produced flows exceeds a bandwidth limit (S220). If the flow does not exceed the bandwidth limit, the data packet is transferred according to a first flow management policy (S225). If the flow exceeds the bandwidth limit, a determination is made as to whether the flow is to be dropped based on the first flow policy (S230).

If it is determined in operation S230 that the packet is to be dropped, a flow drop process is performed (S235). If it is determined that the packet is not to be dropped, a second flow for the flow exceeding the bandwidth limit is produced (S240). For example, the second flow may refer to a frame field indicating a layer 2 destination MAC address to identify a subscriber who receives the data packet. In the flow drop process (S235), the packet may be marked instead of unconditionally dropped. The marked packet may be preferentially dropped upon rate limiting or congestion control.

A determination is then made as to whether each of the second flows exceeds the bandwidth limit (S245). If the second flow does not exceed the bandwidth limit, the data packet is transferred according to a second flow management policy (S255). If the second flow exceeds the bandwidth limit, a drop process is performed on the second flow or subsequent flow processing is performed, according to the second flow policy (S250).

Figure 3:
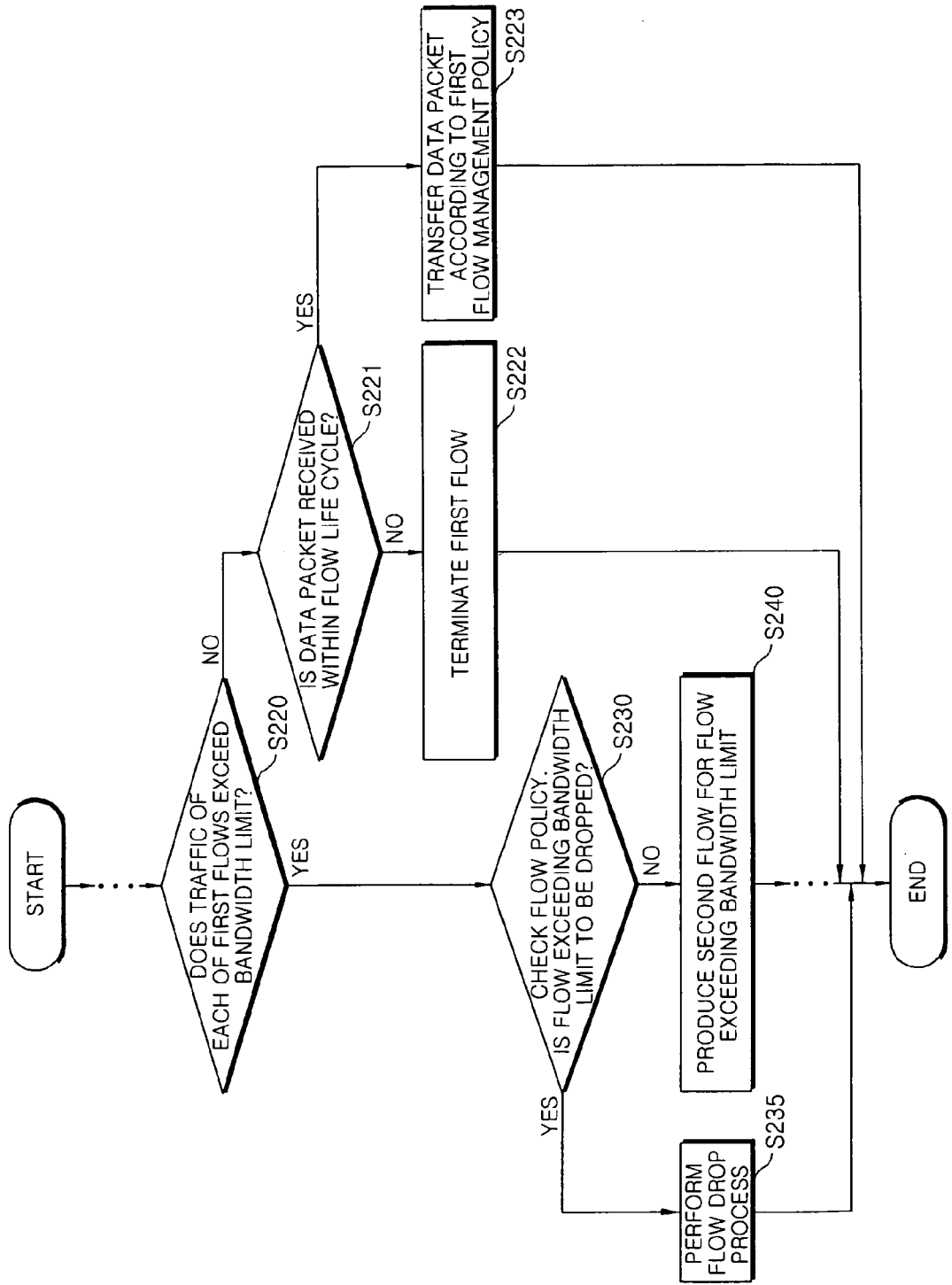
FIG. 3 is a flowchart illustrating a data packet transferring operation S225 according to a first flow management policy of FIG. 2.

FIG. 3 is a flowchart illustrating operation S225 of transferring the data packet according to the first flow management policy in FIG. 2.

Operation S225 of transferring the data packet according to the first flow management policy will be described in detail. First, a determination is made as to whether a data packet is received within a flow life cycle (S221). If the data packet is received within a flow life cycle, it is transferred according to the flow management policy (S223), and otherwise, the flow is terminated (S222).

Meanwhile, the same may apply to operation S255 of transferring the data packet according to the second flow management policy.

An example of traffic flow management for respective subscribers will now be described, beginning with flow management for the traffic 110 of subscriber A.

A determination is made as to whether the VoIP flow 111 of subscriber A produced in operation S215 exceeds the flow bandwidth in operation S220. If it is determined that the VoIP flow 111 exceeds the flow bandwidth, a determination is made in operation S230 as to whether the VoIP flow 111 is to be divided. If it is determined that the VoIP flow 111 is to be divided, the second flows 114, 115, and 116 for respective destinations are produced according to the policy in operation S240. A determination is then made in operation S245 as to whether the second flows exceed the bandwidth limit.

In operation S250, the packet of one of the three second flows is dropped according to the policy. The other packets are transferred in operation S255. If there is no traffic for a predetermined period of time in the VoIP flow 111 of the traffic 110 of subscriber A, a flow life cycle is measured in the first flow's life determining operation S221 and the second flow's life determining operation. If it is determined that the flow's life ends, the flow is terminated in the first flow termination operation S222 and the second flow termination operation.

A determination is made in operation S220 as to whether the video flow 112 of subscriber A exceeds the bandwidth limit. If it is determined that the video flow 112 does not exceeds the bandwidth limit, a second flow is not produced and the first flow is subjected to the first flow's life determining operation S221. The packet is transferred in operation S223. If there is no traffic for a predetermined period of time in the video flow 112 of subscriber A, the flow life cycle is measured in operation S221. If the flow's life ends, the flow is terminated in operation S222.

Meanwhile, a determination is made in operation S220 as to whether the best effort flow 113 of the subscriber A exceeds the bandwidth limit. If the best effort flow 113 of the subscriber A exceeds the bandwidth limit, the first flow packet is dropped arbitrarily or without producing the second flow, according to a policy. If it is determined in operation 220 that the best effort flow 113 of the subscriber A no longer exceeds the bandwidth limit after some of the packets are dropped, the best effort flow 113 is subjected to the first flow's life determining operation S221. The packet is transferred in operation S223. If there is no traffic for a predetermined period of time in the best effort flow 113 of subscriber A, the flow life cycle is measured in operation S221. If the flow life cycle expires, the flow is terminated in operation S222.

Next, flow management for the traffic 120 of subscriber B will be described.

If it is determined in S220 that the VoIP flow 121 for subscriber B produced in operation S215 does exceed the bandwidth limit. The second flow is not produced. The first flow is subjected to the first flow's life determining operation S221 and the packet is transferred in operation S223. If there is no traffic for a predetermined period of time in the VoIP flow 121 for subscriber B, a flow life cycle is measured in operation S221. If the flow life cycle expires, the flow is terminated in operation S222.

If it is determined in operation S220 that the video flow 122 for subscriber B exceeds the bandwidth limit, and in operation S230 that the flow is to be divided, the second flows 124 and 125 for respective destinations are produced according to the policy in operation S240. A determination is then made in operation S245 as to whether each of the second flows exceeds the bandwidth limit.

According to a policy in an exemplary embodiment, a packet of one of the two flows is dropped in S250 and a packet of the other flow is transferred in operation S255. If there is no traffic for a predetermined period of time in the video flow 122 for subscriber B, the flow life cycle is measured in the first flow's life determining operation S221 and the second flow's life determining operation. If the flow life cycle expires, the flow is terminated in the first flow termination operation S222 and the second flow termination operation.

A determination is made in operation S220 as to whether the best effort flow 123 of the subscriber B exceeds the bandwidth limit. If it does, the first flow packet is dropped arbitrarily or without producing the second flow, according to a policy in an exemplary embodiment. If it is determined in operation S220 that the best effort flow 123 for subscriber B no longer exceeds the bandwidth limit after the packet is dropped, the best effort flow 123 is subjected to the first flow's life determining operation S221. The packet is transferred in operation S223.

If there is no traffic for a predetermined period of time in the best effort flow 123 for subscriber B, a flow life cycle is measured in the first flow's life determining operation S221. If the flow life cycle expires, the flow is terminated in operation S222.

Finally, flow management for the traffic 130 of subscriber C will be described.

If it is determined in operation S220 that the VoIP flow 131, the video flow 132, and the best effort flow 133 for subscriber C produced in operation S215 do not exceed the bandwidth limit, a second flow is not produced. The first flows are subjected to the first flow's life determining operation S221. The packet is transferred in operation S223. If there is no traffic for a predetermined period of time in the VoIP flow 131, the video flow 132, and the best effort traffic flow 133 for subscriber C, a flow life cycle is measured in the first flow's life determining operation S221. If the flow life cycle expires, the flow is terminated in operation S222.

The flow extinction and the flow packet drop may be implemented in various ways according to policy, as described above. That is, the first packet drop operation S235 and the second packet drop operation S250, and the first flow's life determining operation S221 and the first flow termination operation S222, may be implemented in several ways according to policy. For example, marking may be used instead of the drop, and the flow extinction determination may be made based on a measured flow traffic bandwidth or packet period.

According to the present invention, the bandwidth limits in the first flow bandwidth excess determining operation S220 and the second flow bandwidth excess determining operation S245 may be set according to traffic in an output port or a packet buffer. Where the bandwidth limit used in operations S220 and S245 may be set automatically depending on a queue of the output port or the packet buffer to dynamically manage the bandwidth, the bandwidth will be measured dynamically.

Figure 4:
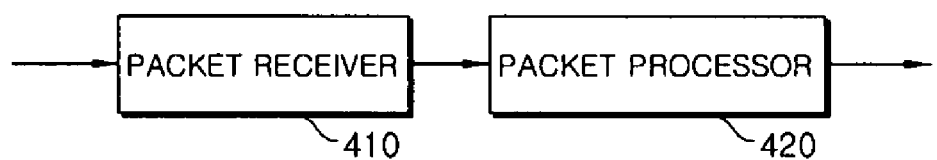
FIG. 4 is a block diagram of an apparatus for dynamically managing hierarchical flows according to an exemplary embodiment of the present invention.

FIG. 4 is a block diagram of an apparatus for dynamically managing hierarchical flows according to an exemplary embodiment of the present invention.

The apparatus for dynamically managing hierarchical flows according to the present invention includes a packet receiver 410 and a packet processor 420. The packet receiver 410 receives data packets transferred over a network. The packet processor 420 classifies the received data packets based on their attributes to produce first flows, and determines whether traffic of each flow exceeds a predetermined bandwidth limit, performs a packet drop process or produces second flows for first flows that exceed the bandwidth limit, according to a flow-specific policy, and performs flow processing on the second flows according to a second flow policy. Packet drop and delivery are performed by the method described with reference to FIGS. 2 and 3.

For example, the packet processor 420 determines whether traffic of each of the first flows exceeds the predetermined bandwidth limit. If the traffic does not exceed the bandwidth limit, the packet processor 420 also determines whether additional data packets are received within a flow life cycle. If additional packets are received, the packet processor 420 delivers the data packets according to the first flow management policy.

Also, the packet processor 420 determines whether traffic of each of the second flows exceeds the predetermined bandwidth limit, and performs a packet drop process or transfers data packets for second flows that exceed the bandwidth limit, according to a flow-specific policy.

The packet processor 420 may mark the packets for reference upon rate limiting or congestion control instead of immediately dropping the packets in the drop process. The bandwidth limit set for each flow is changed depending on the state of an output buffer or an output port that stores the packets to be transferred.

Meanwhile, the method for dynamically managing hierarchical flows may be embodied in the form of a computer program. Codes and code segments of the program may be inferred by computer programmers of ordinary skill. The program is stored in a computer-readable information recording medium, and read and executed by a computer to perform the method for dynamically managing hierarchical flows. The information recording medium includes a magnetic recording medium, an optical recording medium, and a carrier wave medium.

According to the present invention, only flows exceeding the bandwidth limit or causing congestion are hierarchically divided for management. This makes it possible to finely manage the flows without complex operations.

And, only flows using excessive bandwidth or causing congestion are hierarchically dynamically managed. This helps solve problems of unfair aggregation, distribution, and switching in a multimedia network, circuit and packet combined switching, wireless and wired delivery, fundamentally or at a low cost.

That is, in the event of increased traffic or congestion, it is possible to finely and dynamically manage only those flows causing the congestion or increase. Thus, it is possible to solve a problem of unfairness when there is increased traffic or congestion, and deliver packets while preventing various traffic attributes from being damaged by a network combination.

The present invention may be applied to the field of more efficiently processing packet traffic while maintaining compatibility with an existing packet data network in transferring both circuit traffic and packet traffic in a packet switched network.

It will be apparent to those skilled in the art that various modifications can be made to the exemplary embodiments of the present invention described herein without departing from the spirit and scope of the present invention defined by the appended claims and their equivalents.

What is claimed is:

1. A method for dynamically managing hierarchical flows, comprising:
   receiving data packets, classifying the data packets according to attributes of the received data packets, and producing first flows;
   determining whether traffic of each of the first flows exceeds a predetermined bandwidth limit, and
      if the traffic of at least one of the first flows is determined to exceed a predetermined bandwidth, determining whether the at least one of the first flows exceeding the predetermined bandwidth is to be dropped according to a first flow policy,
         if the at least one of the first flows exceeding the predetermined bandwidth is determined to be dropped according to a first flow policy, performing a packet drop process, and
         if the at least one of the first flows exceeding the predetermined bandwidth is determined not to be dropped, producing second flows for the at least one of the first flows exceeding the bandwidth limit; and
   performing second flow processing on the second flows according to a second flow policy.

2. The method of claim 1, wherein the producing of the second flows comprises determining whether the traffic of each of the first flows exceeds the predetermined bandwidth limit, further determining, when the traffic does not exceed the bandwidth limit, whether a data packet is received within a life cycle of each flow, and transferring, if the data packet is received, the data packet according to a first flow management policy.

3. The method of claim 1, wherein the performing of the second flow processing comprises determining whether traffic of each of the second produced flows exceeds the predetermined bandwidth limit, and performing a packet drop process or packet transfer for a flow that exceeds the bandwidth limit, according to a flow-specific policy.

4. The method of claim 1, wherein the producing of the first flows comprises producing the first flows according to subscribers transmitting the data packets and services.

5. The method of claim 1, wherein the producing of the second flows comprises producing the second flows according to destinations of the data packets.

6. The method of claim 1, wherein the packet drop process marks the data packet instead of immediately dropping the data packet.

7. The method of claim 1, wherein the bandwidth limit is set for each flow and changed depending on a state of an output buffer or an output port that stores the packet to be transferred.

8. An apparatus for dynamically managing hierarchical flows, comprising:
   a packet receiver for receiving data packets; and
   a packet processor for
      classifying the received data packets based on attributes of the received data packets to produce first flows,
      determining whether traffic of each of the first flows exceeds a predetermined bandwidth limit,
         if the traffic of at least one of the first flows is determined to exceed a predetermined bandwidth, determining whether the at least one of the first flows exceeding the predetermined bandwidth is to be dropped according to a first flow policy,
         if the at least one of the first flows exceeding the predetermined bandwidth is determined to be dropped according to a first flow policy, performing a packet drop process, and
         if the at least one of the first flows exceeding the predetermined bandwidth is determined not to be dropped, producing second flows for the at least one of the first flows exceeding the bandwidth limit, and
      performing flow processing on the second flows according to a second flow policy.

9. The apparatus of claim 8, wherein the packet processor determines whether the traffic of each of the first flows exceeds the predetermined bandwidth limit, determines, when the traffic does not exceed the bandwidth limit, whether a data packet is received within a life cycle of each flow, and transfers, if the data packet is received, the data packet according to a first flow management policy.

10. The apparatus of claim 8, wherein the packet processor determines whether traffic of each of the second produced flows exceeds the predetermined bandwidth limit, and performs a packet drop process or data packet transfer for a flow that exceeds the bandwidth limit, according to a flow-specific policy.

11. The apparatus of claim 9, wherein the packet processor marks the packet instead of immediately dropping the packet.

12. The apparatus of claim 9, wherein the bandwidth limit is set for each flow and changed depending on a state of an output buffer or an output port that stores the packet to be transferred.

* * * * *